United States Patent
Beck

(10) Patent No.: US 12,197,041 B2
(45) Date of Patent: Jan. 14, 2025

(54) SPECTACLES

(71) Applicant: VISI Management GMBH, Heubach (DE)

(72) Inventor: Volker Beck, Schwäbisch Gmünd (DE)

(73) Assignee: VISI MANAGEMENT GMBH, Fleubach (DE)

( * ) Notice: Subject to any disclaimer, the term of this patent is extended or adjusted under 35 U.S.C. 154(b) by 615 days.

(21) Appl. No.: 17/425,583

(22) PCT Filed: Feb. 20, 2020

(86) PCT No.: PCT/EP2020/054417
§ 371 (c)(1),
(2) Date: Jul. 23, 2021

(87) PCT Pub. No.: WO2020/178029
PCT Pub. Date: Sep. 10, 2020

(65) Prior Publication Data
US 2022/0099995 A1     Mar. 31, 2022

(30) Foreign Application Priority Data
Mar. 6, 2019   (DE) .................... 10 2019 203 035.1

(51) Int. Cl.
G02C 1/04      (2006.01)
G02C 1/00      (2006.01)
G02C 5/00      (2006.01)

(52) U.S. Cl.
CPC .............. G02C 1/04 (2013.01); G02C 1/10 (2013.01); G02C 5/008 (2013.01); G02C 2200/10 (2013.01)

(58) Field of Classification Search
None
See application file for complete search history.

(56) References Cited

U.S. PATENT DOCUMENTS 2,516,549 A * 7/1950 Chappell ............... G02C 1/04
                                                  351/103
3,917,387 A    11/1975 Ensing
(Continued)

FOREIGN PATENT DOCUMENTS

CN     206224069 U    6/2017
DE       810437 C1    7/1949
(Continued)

OTHER PUBLICATIONS

PCT International Preliminary Report dated Sep. 24, 2020 for PCT/EP2020/054417.
(Continued)

*Primary Examiner* — Darryl J Collins
(74) *Attorney, Agent, or Firm* — Farjami & Farjami LLP

(57) ABSTRACT

Disclosed are spectacles having two lenses, a rigid or flexible frame including a frame part extending on an upper or a lower lens edge of each lens, an arm linked on each end of the frame using a hinge, a plastic thread associated with each lens, each end of the plastic thread is attached to the frame. The attachment point is formed as follows: one end of the plastic thread forms a loop that wraps around a frame part, two longitudinal sections of an end section of the plastic thread, which form the loop and extend parallel to one another, are jointly guided through a longitudinal borehole of a sleeve and are enclosed by the sleeve, the tension of the plastic is freely selectable by displacing the two longitudinal sections relative to one another or by displacing the sleeve on the two longitudinal sections.

20 Claims, 3 Drawing Sheets

(56) References Cited

U.S. PATENT DOCUMENTS

| | | | | |
|---|---|---|---|---|
| 4,371,238 A | * | 2/1983 | Lhospice | G02C 1/04 351/133 |
| 5,457,504 A | * | 10/1995 | Danloup | G02C 1/04 351/149 |
| 5,465,466 A | | 11/1995 | Napeir | |
| 5,663,780 A | * | 9/1997 | Murai | G02C 1/04 351/52 |
| 5,684,558 A | * | 11/1997 | Hamamoto | G02C 1/04 351/86 |
| 5,914,768 A | | 6/1999 | Hyoi | |
| 2001/0017686 A1 | | 8/2001 | Hyoi | |
| 2008/0246913 A1 | * | 10/2008 | Wong | G02C 1/04 351/41 |

FOREIGN PATENT DOCUMENTS

| | | |
|---|---|---|
| DE | 696 11 045 T2 | 12/1995 |
| JP | 3028139 | 6/1996 |
| JP | H 11-44865 A | 2/1999 |
| JP | 2001-242422 | 9/2001 |
| JP | 2022-525035 | 8/2020 |

OTHER PUBLICATIONS

PCT International Search Report dated Jun. 8, 2020 for PCT/EP2020/054417.

Notice of Rejection dated Jul. 27, 2023 for Application CN 202080015943.5.

Non-Final Office Action dated Sep. 4, 2023 for Application JPO 2021-553051.

Notification of Reason for Refusal dated Aug. 19, 2024 for KR Application 10-2021-7028966.

* cited by examiner

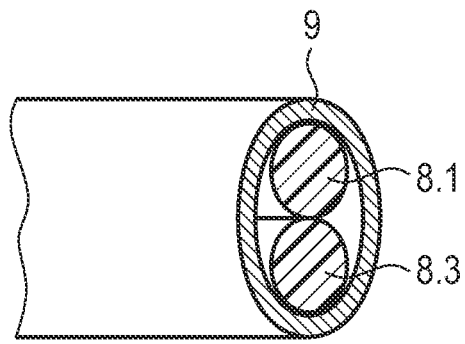 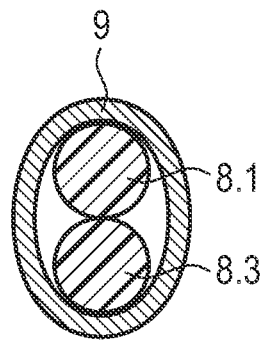
Fig. 4a          Fig. 4b
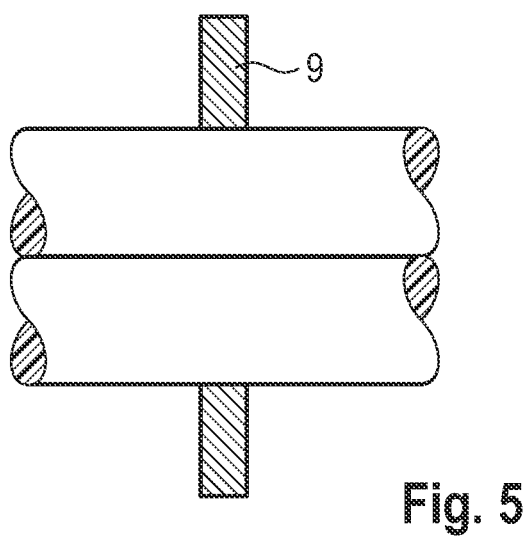
Fig. 5

SPECTACLES

This is a U.S. national phase application, which is based on, and claims priority from, PCT application Ser. No. PCT/EP2020/054417, filed Feb. 20, 2020, which is based on, and claims priority from German Patent Application Serial No. DE 102019203035.1, filed Mar. 6, 2019, which are hereby incorporated by reference into the present application.

The invention relates to spectacles according to the preamble of Claim 1. The spectacles are distinguished by low weight and by a particularly attractive appearance.

As one knows, spectacles not only have a rational function, for example for better vision or as a protection against sunshine. Rather, they are a fashion article, esteemed worldwide by a variety of people of all layers of society.

One can differentiate between two types of spectacles, on the one hand, the heavyweight, coarse, predominantly dark-colored plastic or horn-rimmed spectacles and, on the other hand, the extremely light spectacles having a metal frame made of high-strength and therefore thin material such as titanium, wherein the frame plays the most restrained role possible, so that it is not even recognized as such.

The present invention relates to the second-mentioned category. As much as possible, the frame does not appear at all here. It is designed as sparely as possible and, except for the arms, which press against the temples or go over the ears with a rounding, only consists of thin, light frame parts which extend along the upper edge of the two lenses. Nylon threads are used, which enclose the lower region of the individual lens and are inserted here into a groove which is ground into the edge of the lens. Such plastic threads, usually made of nylon, are used to clamp the lens between a frame part which extends along the upper lens edge and the mentioned plastic thread. The plastic thread therefore has a supporting and thus important function for the stability of the entire spectacles.

The spectacles can also be constructed so that the metal frame extends on the lower edge and the nylon thread extends on the upper edge of the lenses.

The plastic thread does not appear where, as mentioned above, it lies in a groove which is ground into the edge region of the lens. However, reliable and also inconspicuous fixing of plastic thread and metal frame is difficult. Such fixing is described in CN 206224069. A disk is provided here which has two holes. A plastic thread which forms a loop is guided through the two holes of the disk. See FIG. 3 therein. A loop is formed from the plastic thread, which wraps around a part of the metal frame. As one knows, such a loop comprises a curved section and a longitudinally extending section in each case before the loop and after the loop; the two longitudinal sections extend in parallel to one another.

In the cited patent specification, the loop is associated with a disk having two holes. One longitudinal section of the thread extends through one hole and the other longitudinal section through the other hole.

The solution is unfavorable because the loop can only be loosened again with difficulty due to jamming of the thread in the two-hole disk.

DE 696 11 045 T2 describes spectacles having two lenses, a frame, and linked-on arms, A plastic thread, which wraps around a part of the circumference of the lens and presses against the lens edge, is associated with each lens.

U.S. Pat. No. 5,914,768 A, US 2001/0017686 A1, and JP H11-044865 A each describe spectacles having frame part, nose bridge, hinges, arms, plastic threads. These known embodiments have disadvantages. These are, for example, relatively difficult assembly of the plastic threads and the lenses or that the tension of the threads wrapped around the lenses are not freely selectable, or that lenses of different diameters are not freely selectable.

The invention is based on the object of designing spectacles according to the preamble of Claim 1 in such a way that the relevant plastic thread, which wraps around one of the lenses in each case, can be fixed and also released again with freely selectable tension and in addition is usable for the application with lenses of different diameters.

This object is achieved by the features of Claim 1.

The differences from the embodiment according to the cited CN specification are as follows:

In the invention, a sleeve is provided, which as such has only a single hole. The two longitudinal sections of the plastic thread used to form the loop are located in the hole of the sleeve touching one another. To tension the plastic thread, the sleeve is displaced in such a way that the loop tightens. At the same time, the length of the thread may be precisely changed, in particular reduced. The reduction of the thread length means tensioning of the thread at the same time and thus correspondingly strong contact pressure on the lens in terms of ensuring stabilization of the entire spectacles. The thread can also be replaced easily if needed, in contrast to the cited CN specification.

Furthermore, the close wrapping around the thread by the sleeve has the effect that the position relative to the thread set by displacing the sleeve remains unchanged, namely because a displacement of sleeve relative to the thread is suppressed due to the friction as a result of the close contact.

Again, in contrast to the cited CN document, the attachment point of thread end region on the frame part is better centered, so that an improved functionality and an inconspicuous appearance are achieved.

A very essential part of the invention is that neither the lenses nor the frame has to be provided with holes to be able to screw together parts of the spectacles or to fix a nylon thread in the hole.

The prior art and the spectacles according to the invention are explained in more detail on the basis of the drawings. In the specific figures:

FIG. 4a shows a perspective illustration of the sleeve according to FIG. 3.

FIG. 4b shows the subject matter of FIG. 4a in a section perpendicular to the longitudinal axis of the sleeve.

FIG. 5 shows a subject matter analogous to that according to FIGS. 4a and 4b having a sleeve, the longitudinal extension of which is short, so that it represents a perforated ring.

Figure 1:
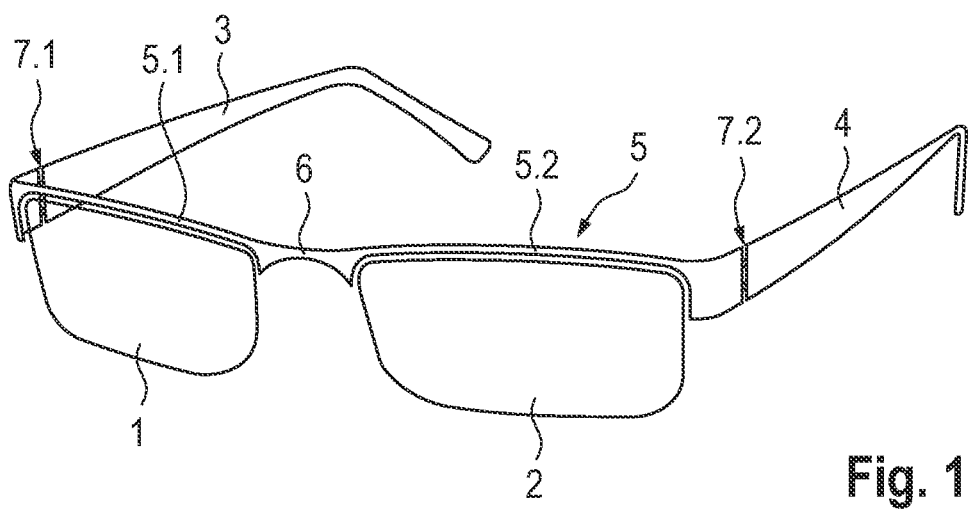
FIG. 1 shows known spectacles in a perspective illustration.

The known embodiment of spectacles shown in FIG. 1 comprises two lenses 1, 2. The lenses are supported by a frame, which comprises the following components:

Two arms 3, 4, a supporting part 5, comprising a first section 5.1, which extends over the upper edge of lens 1, and a second section 5.2, which extends over the upper edge of lens 2, The sections 5.1 and 5.2 are integral with a nose bridge 6 located between them. The two arms 3, 4 are each attached via a hinge 7.1, 7.2 to the sections 5.1 and 5.2 of the frame 5.

Figure 2A:
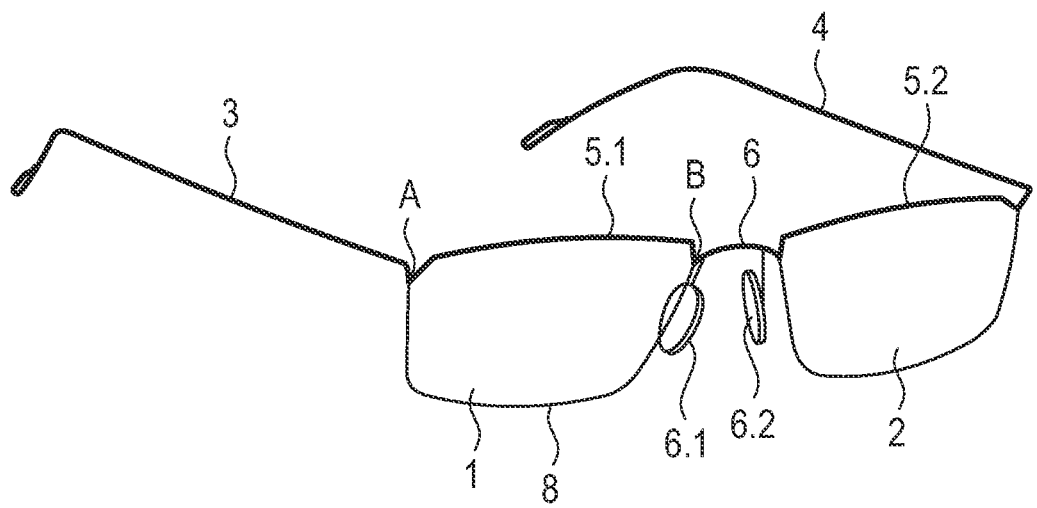
FIG. 2 shows spectacles according to the invention, again in a perspective illustration.

The spectacles according to the invention shown in FIG. 2 are schematically shown. They are embodied in a very light construction. The frame can essentially be embodied like that of FIG. 1. However, the components 3, 4, 5.1, 5.2, and 6 are produced from wire, for example from a titanium wire. Nose pads 6,1, 6.2 are located on the nose bridge 6.

Figure 2B:
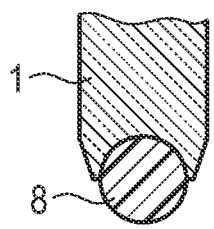

The special feature of the spectacles according to FIG. 2 is a thread 8 made of plastic. This is guided around at least a part of the circumference of each lens. It can be inserted into a groove of the lens edge. See the enlarged sectional view of FIG. 2b.

Thread 8 can wrap around the relevant lens on its entire circumference, thus beginning at the point A and also ending again at the point A. Thread 8 can also wrap around only a part of the lens, however, for example beginning at the point A and ending at the point B. It is obvious that it is embodied in the same way in both lenses 1 and 2.

Figure 3:
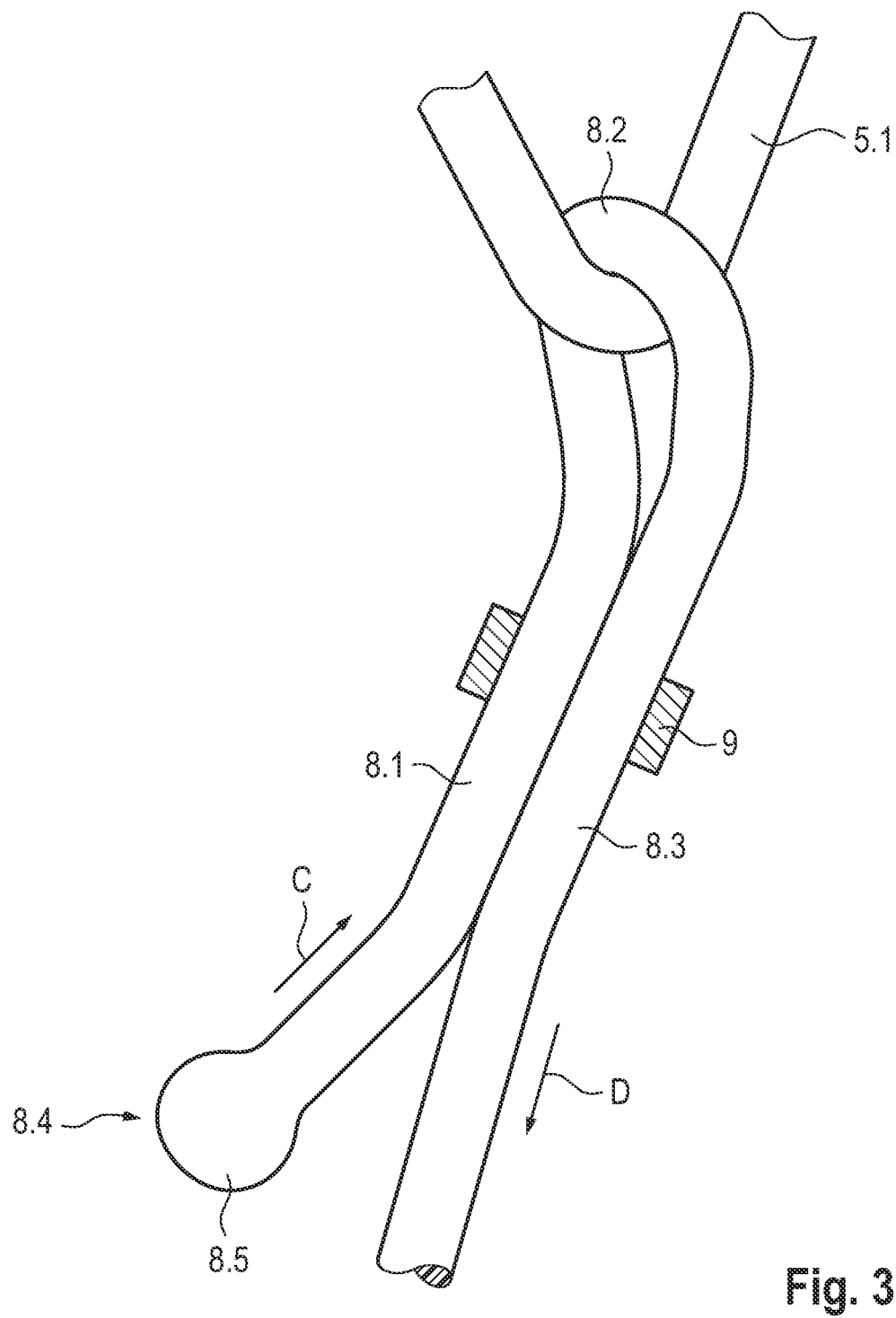
FIG. 3 shows an enlarged illustration of the components in the region of e attachment point between a plastic thread and a frame part.

FIG. 3 shows the decisive details of the invention. The plastic thread 8 can again be seen, specifically an end section thereof. This end section is shaped into a loop, comprising a longitudinal section 8.1, a curved section 8.2, and a second longitudinal section 8.3. It could also be said that the end section of the thread 8 has a hairpin-shaped design. The end 8.4 of the thread 8 is located on the first longitudinal section 8.1. A plug 8.5 has resulted here due to melting, which has a larger diameter than thread 8 on its remaining extension.

As can be seen, the loop of the thread 8 wraps around a frame part, for example frame part 5.1 or 5.2. The wrapping begins at the attachment point A of the relevant frame part. It then extends—counterclockwise seen in Figure a—around the lens 1 to the attachment point B. A loop is again formed from the second thread end here, see above, analogous to the loop shown in FIG. 3.

The attachment of the thread to a frame part by means of a loop is known. The fixing of the loop is difficult here. The loop is not to come apart during the assembly, and of course is also not to loosen independently after the assembly. The invention prevents this. A sleeve 9 is substantially provided for this purpose, the effect of which will be described hereinafter. The assembly of the plastic thread 8 on the metal frame part 5.1 is performed as follows:

First, the end 8.4 of the thread 8 is guided through the hole of the sleeve 9. The end 8.4 of the thread 8 is not yet melted, so that it also does not have the plug shown in FIG. 3. The end 8.4 of thread 8 is then guided around frame part 5.1, wherein the loop shown in FIG. 3 results. Longitudinal section 8.1 of the thread 8 is then guided further, specifically through the sleeve 9. The clear width of sleeve 9 is dimensioned in such a way that the two longitudinal sections 8.1 and 8.3 of sleeve 9 are closely enclosed and also press closely against one another. As can be seen, both longitudinal sections 8.1 and 8.3 extend some distance in parallel to one another.

The tightening of the loop now takes place. This can be carried out in that the sleeve 9 is displaced toward metal frame part 5.1 seated on the longitudinal sections 8.1 and 8.3. However, the longitudinal sections 8.1 and 8.3 can also be displaced in relation to one another simultaneously, whereby the length of the thread available for wrapping around lens 1 changes. If the mentioned relative movement of the longitudinal sections 8.1 and 8.3 takes place according to the arrows C and D, a greater length is thus available for wrapping around lens 1. It can be seen that the tension in the thread 8 as it wraps around the lens 1 can thus also be changed. The tension is to be as high as possible so that a contact pressure of lens 1 by means of the thread 8 against the metal frame part 5.1 is increased. If the tension is sufficiently high, this thus means that the lens is clamped between the thread 8 and the relevant metal frame part 5.1.

A very stable structure results in this way. The connection between the lens or the lenses and the frame is achieved without a screw connection. Therefore, machining of the lens is dispensed with, for example by applying holes or by screw connections. During the assembly, the close connection between sleeve 9 and the two longitudinal sections 8.1 and 8.3 due to the mechanical friction between the mention components ensures that the loop does not come apart during the assembly.

The mentioned plug 8.5 can be melted after the end 8.4 is guided through the sleeve 9. The compaction 9 is used as additional security against loosening of the loop construction. The plug 8.5 prevents the thread 8 from slipping out of the sleeve 9.

FIGS. 4a and 4b schematically illustrate the longitudinal sections 8.1 and 8.3 inside the sleeve 9. As can be seen from FIG. 4b, the sleeve 9 has an oval hole in cross section, which is nearly completely filled up by the cross sections of the longitudinal sections 8.1 and 8.3.

FIG. 5 again shows the two longitudinal sections 8.1 and 8.3. Sleeve 9 is of lesser axial extension in this case; specifically in the present case it is a perforated disk or a ring.

The thread does not necessarily have to have a round cross section. It can also be hollow and is thus formed as a tube.

As described above, the plastic thread begins at a first point of the lens circumference, for example in the region of the relevant arm, and is fixed at a second attachment point, generally in the region of the nose bridge, on the metal frame part. However, it is also conceivable that the two attachment points A and B coincide. In this case, the plastic thread extends around the entire circumference of the relevant lens.

LIST OF REFERENCE NUMERALS 1 lens
2 lens
3 arm
4 arm
5 frame
5.1 frame part
5.2 frame part
6 nose bridge
6.1 nose pad
6.2 nose pad
7.1 hinge
7.2 hinge
8 plastic thread
8.1 longitudinal section
8.2 bend
8.3 longitudinal section
8.4 end
8.5 plug

The invention claimed is:

1. A spectacles comprising:
two lenses;
a rigid or flexible frame including a first frame part extending on an upper or a lower lens edge of a first lens of the two lenses, a second frame part extending on an upper or a lower lens edge of a second lens of the two lenses, a nose bridge located between the first frame part and the second frame part, and an arm linked on each end of the frame using a hinge;
a first plastic thread associated with the first lens that wraps around at least a part of a circumference of the first lens and presses against an edge of the first lens, and a second plastic thread associated with the second lens that wraps around at least a part of a circumference of the second lens and presses against an edge of the second lens;

each end of the first plastic thread and the second plastic thread being attached to the frame at a respective attachment point;

each respective attachment point is formed as follows:

one end of one of the first plastic thread or the second plastic thread forms a loop, which wraps around a frame part;

two longitudinal sections of an end section of the one end of the first plastic thread or the second plastic thread, which form the loop and extend parallel to one another, are jointly guided through a single longitudinal borehole of a sleeve, and are enclosed by the sleeve; and wherein the tension of the one of the first plastic thread or the second plastic is freely selectable by displacing the two longitudinal sections relative to one another or by displacing the sleeve on the two longitudinal sections.

2. The spectacles according to claim 1, wherein an end of one of the two longitudinal sections comprises a plug, which prevents the end of the one of the two longitudinal sections from being pulled out through the single longitudinal borehole of the sleeve.

3. The spectacles according to claim 2, wherein the plug is produced by melting the end of the one of the two longitudinal sections.

4. The spectacles according to claim 3, wherein the first plastic thread and the second plastic thread includes nylon or perlon.

5. The spectacles according to claim 3, wherein one attachment point of the one of the first plastic thread or the second plastic thread on the frame is located on or by of the hinge, and the other attachment point is located on the nose bridge.

6. The spectacles according to claim 3, wherein the material of the rigid or flexible frame is metal or plastic.

7. The spectacles according to claim 4, wherein one attachment point of the one of the first plastic thread or the second plastic thread on the frame is located on or by the hinge, and the other attachment point is located on the nose bridge.

8. The spectacles according to claim 4, wherein the material of the frame is metal or plastic.

9. The spectacles according to claim 2, wherein the first plastic thread and the second plastic thread includes nylon or perlon.

10. The spectacles according to claim 9, wherein one attachment point of the one of the first plastic thread or the second plastic thread on the frame is located on or by the hinge, and the other attachment point is located on the nose bridge.

11. The spectacles according to claim 9, wherein the material of the frame is metal or plastic.

12. The spectacles according to claim 2, wherein one attachment point of the one of the first plastic thread or the second plastic thread on the frame is located on or by of the hinge, and the other attachment point is located on the nose bridge.

13. The spectacles according to claim 12, wherein the material of the rigid or flexible frame is metal or plastic.

14. The spectacles according to claim 2, wherein the material of the rigid or flexible frame is metal or plastic.

15. The spectacles according to claim 1, wherein the first plastic thread and the second plastic thread includes nylon or perlon.

16. The spectacles according to claim 15, wherein one attachment point of the one of the first plastic thread or the second plastic thread on the frame is located on or by the hinge, and the other attachment point is located on the nose bridge.

17. The spectacles according to claim 15, wherein the material of the rigid or flexible frame is metal or plastic.

18. The spectacles according to claim 1, wherein one attachment point of the one of the first plastic thread or the second plastic thread on the frame is located on or by the hinge, and the other attachment point is located on the nose bridge.

19. The spectacles according to claim 18, wherein the material of the rigid or flexible frame is metal or plastic.

20. The spectacles according to claim 1, wherein the material of the rigid or flexible frame is metal or plastic.

* * * * *